United States Patent
Tang et al.

(10) Patent No.: US 11,294,472 B2
(45) Date of Patent: Apr. 5, 2022

(54) AUGMENTED TWO-STAGE HAND GESTURE INPUT

(71) Applicant: Microsoft Technology Licensing, LLC, Redmond, WA (US)

(72) Inventors: Sheng Kai Tang, Redmond, WA (US); Julia Schwarz, Redmond, WA (US); Thomas Matthew Gable, Seattle, WA (US); Casey Leon Meekhof, Redmond, WA (US); Chuan Qin, Bellevue, WA (US); Nahil Tawfik Sharkasi, Woodinville, WA (US); Nicholas Ferianc Kamuda, Seattle, WA (US); Ramiro S. Torres, Seattle, WA (US); Joshua Kyle Neff, Renton, WA (US); Jamie Bryant Kirschenbaum, Sammamish, WA (US); Neil Richard Kronlage, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 16/365,114

(22) Filed: Mar. 26, 2019

(65) Prior Publication Data
US 2020/0225758 A1 Jul. 16, 2020

Related U.S. Application Data

(60) Provisional application No. 62/791,642, filed on Jan. 11, 2019.

(51) Int. Cl.
*G06F 3/01* (2006.01)
*G06N 3/02* (2006.01)
*G06F 3/04815* (2022.01)

(52) U.S. Cl.
CPC .............. *G06F 3/017* (2013.01); *G06F 3/013* (2013.01); *G06F 3/04815* (2013.01); *G06N 3/02* (2013.01)

(58) Field of Classification Search
CPC ...... G06F 3/017; G06F 3/04815; G06F 3/011; G06F 3/013
See application file for complete search history.

(56) References Cited

U.S. PATENT DOCUMENTS 6,771,294 B1 * 8/2004 Pulli ....................... G06F 3/017
715/863
8,089,455 B1 * 1/2012 Wieder ................. G06F 3/0386
345/156

(Continued)

OTHER PUBLICATIONS

"International Search Report and Written Opinion Issued in PCT Application No. PCT/US19/067707", dated Mar. 19, 2020, 16 Pages.

*Primary Examiner* — Dino Kujundzic
(74) *Attorney, Agent, or Firm* — Alleman Hall Creasman & Tuttle LLP

(57) ABSTRACT

A method for augmenting a two-stage hand gesture input comprises receiving hand tracking data for a hand of a user. A gesture recognition machine recognizes that the user has performed a first-stage gesture based on one or more parameters derived from the received hand tracking data satisfying first-stage gesture criteria. An affordance cueing a second-stage gesture is provided to the user responsive to recognizing the first-stage gesture. The gesture recognition machine recognizes that the user has performed the second-stage gesture based on one or more parameters derived from the received hand tracking data satisfying second-stage gesture criteria. A graphical user interface element is displayed responsive to recognizing the second-stage gesture.

15 Claims, 10 Drawing Sheets

(56) References Cited

U.S. PATENT DOCUMENTS

| | | | |
|---|---|---|---|
| 9,383,894 B2* | 7/2016 | Schwesinger | G06F 3/04812 |
| 10,353,532 B1* | 7/2019 | Holz | G06F 3/0304 |
| 10,852,839 B1* | 12/2020 | Ravasz | G02B 27/017 |
| 2009/0079813 A1 | 3/2009 | Hildreth | |
| 2009/0100383 A1* | 4/2009 | Sunday | G06F 3/04883 |
| | | | 715/863 |
| 2011/0117535 A1* | 5/2011 | Benko | G09B 5/02 |
| | | | 434/365 |
| 2011/0119216 A1 | 5/2011 | Wigdor | |
| 2012/0113223 A1* | 5/2012 | Hilliges | G06F 3/00 |
| | | | 348/46 |
| 2012/0192108 A1* | 7/2012 | Kolb | G06F 3/0482 |
| | | | 715/810 |
| 2013/0063345 A1* | 3/2013 | Maeda | G06F 3/017 |
| | | | 345/156 |
| 2013/0271360 A1* | 10/2013 | MacDougall | G06F 3/0484 |
| | | | 345/156 |
| 2014/0055343 A1* | 2/2014 | Kim | G06F 3/017 |
| | | | 345/156 |
| 2015/0123890 A1 | 5/2015 | Kapur et al. | |
| 2015/0177841 A1* | 6/2015 | VanBlon | H04W 12/06 |
| | | | 715/863 |
| 2015/0193111 A1* | 7/2015 | Kauffmann | G06F 3/0487 |
| | | | 715/825 |
| 2015/0234477 A1 | 8/2015 | Abovitz et al. | |
| 2015/0248170 A1* | 9/2015 | Abovitz | A63F 13/00 |
| | | | 345/633 |
| 2015/0277570 A1* | 10/2015 | Kauffmann | G06F 3/0484 |
| | | | 345/156 |
| 2015/0309629 A1* | 10/2015 | Amariutei | G06F 1/163 |
| | | | 345/173 |
| 2016/0224123 A1* | 8/2016 | Antoniac | G06F 3/017 |
| 2017/0090747 A1* | 3/2017 | Dash | G06F 3/014 |
| 2017/0192514 A1* | 7/2017 | Karmon | G06K 9/00382 |
| 2018/0120944 A1 | 5/2018 | Wang et al. | |
| 2019/0012819 A1* | 1/2019 | Inoue | G06F 3/011 |
| 2019/0324527 A1* | 10/2019 | Presant | G06F 40/30 |
| 2019/0377464 A1* | 12/2019 | Zhou | G06F 3/0482 |
| 2019/0384407 A1* | 12/2019 | Smith | G06K 9/00389 |

\* cited by examiner

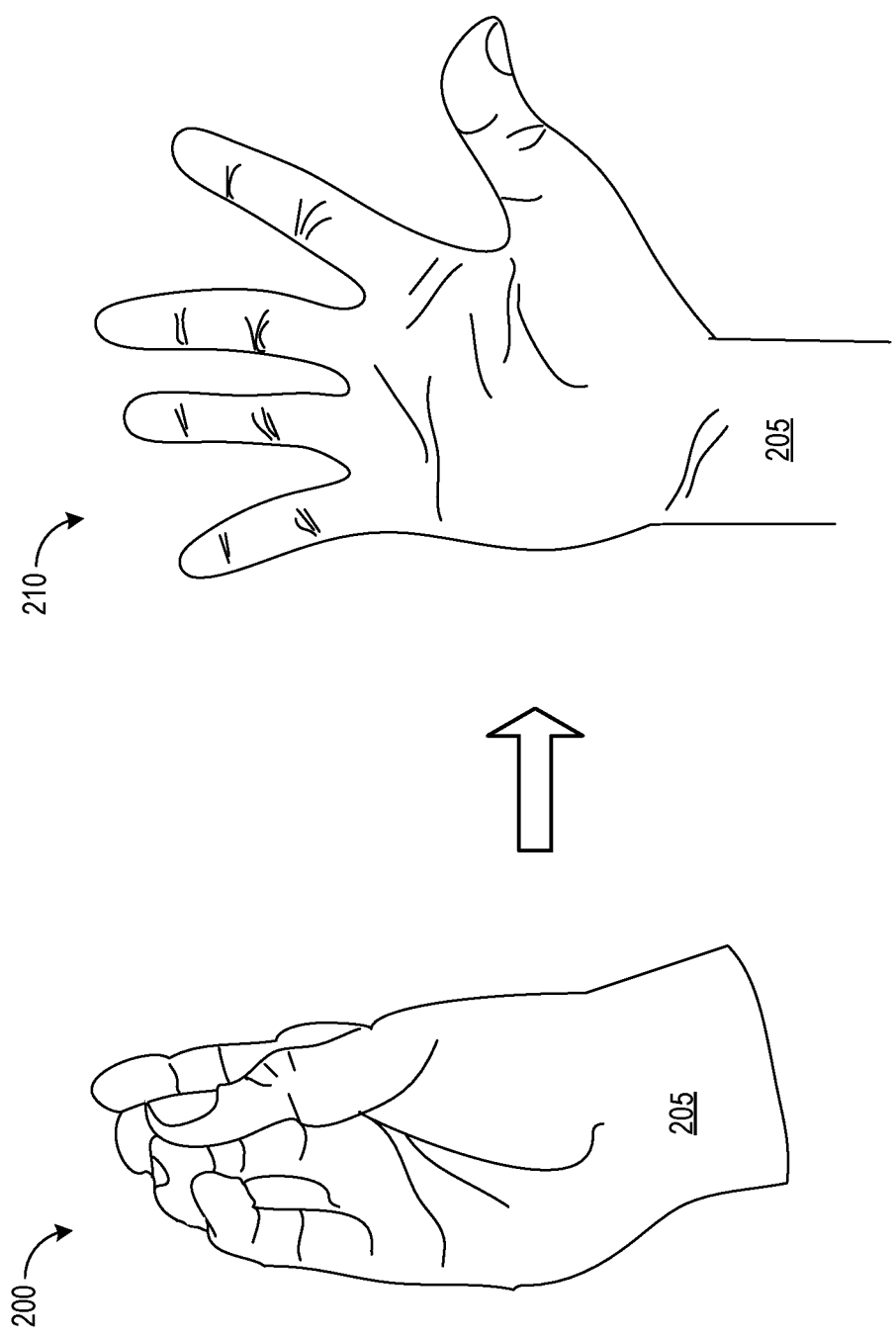

AUGMENTED TWO-STAGE HAND GESTURE INPUT

CROSS REFERENCE TO RELATED APPLICATIONS

This application claims priority to U.S. Provisional Patent Application Ser. No. 62/791,642, filed Jan. 11, 2019, the entirety of which is hereby incorporated herein by reference for all purposes.

BACKGROUND

Virtual and augmented reality applications may rely on gesture input provided by a user to evoke specific commands and actions. Depth and visual cameras may enable hand-tracking applications to recognize and stratify various gesture commands.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for augmenting a two-stage hand gesture input comprises receiving hand tracking data for a hand of a user. A gesture recognition machine recognizes that the user has performed a first-stage gesture based on one or more parameters derived from the received hand tracking data satisfying first-stage gesture criteria. An affordance cueing a second-stage gesture is provided to the user responsive to recognizing the first-stage gesture. The gesture recognition machine recognizes that the user has performed the second-stage gesture based on one or more parameters derived from the received hand tracking data satisfying second-stage gesture criteria. A graphical user interface element is displayed responsive to recognizing the second-stage gesture.

BRIEF DESCRIPTION OF THE DRAWINGS

FIG. 2A shows an illustration of a hand of a user performing a bloom gesture.

DETAILED DESCRIPTION

Various technologies may allow a user to experience a mix of real and virtual worlds. For example, some display devices, such as various head-mounted display devices, may have see-through displays that allow superposition of displayed images over a real-world background environment. The images may appear in front of the real-world background environment when viewed through the see-through display. In particular, the images may be displayed on the see-through display such that they appear intermixed with elements in the real-world background environment in what may be referred to as augmented reality.

Figure 1:
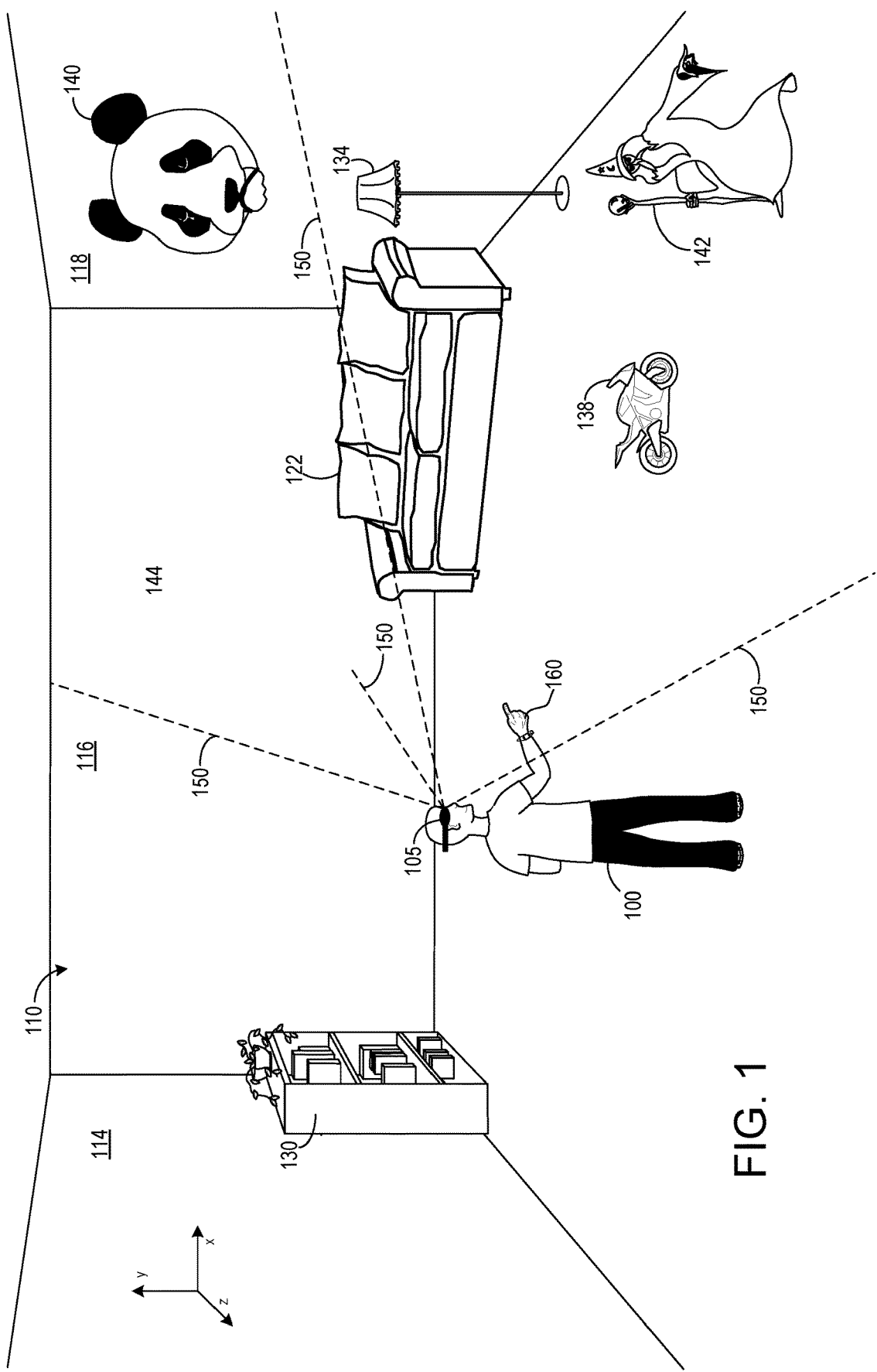
FIG. 1 shows an example augmented reality use environment for a user wearing a head-mounted display.

FIG. 1 is a schematic illustration of a user 100 wearing head-mounted display device 105 and standing in the real-world physical environment of room 110. The room 110 includes a number of physical objects and surfaces, such as walls 114, 116 and 118, couch 122, bookcase 130, and lamp 134, all of which are visible to the user via a see-through display of head-mounted display device 105.

Head-mounted display device 105 may display to user 100 virtual content that appears to be located at different three-dimensional locations within room 110. In the example of FIG. 1, head-mounted display device 105 displays virtual content in the form of a holographic motorcycle 138, holographic panda 140, and holographic wizard 142.

Head-mounted display device 105 may have a field of view, indicated by dotted lines 150, that defines a volume of space in which the user may view virtual content displayed by the device. In different examples of head-mounted display device 105, the field of view may have different shapes, such as cone-shaped, frustum-shaped, pyramid-shaped, or any other suitable shape. In different examples of head-mounted display device 18, the field of view also may have different sizes that occupy different volumes of space.

Sensors included in head-mounted display device 105 may enable natural user interface (NUI) controls, such as gesture inputs based on gestures performed by user's hand 160 when user's hand 160 is within the field of view of outward facing imaging sensors of head-mounted display 105. In this way, user 100 may interact with virtual content without being required to hold a controller or other input device, thus freeing user 100 to interact with real-world and/or virtual world objects with either hand.

Virtual and augmented reality devices and applications may rely on recognizing gesture commands to provide an intuitive interface. However, without employing a controller, user 100 does not have access to dedicated inputs for switching between applications, calling a system menu, adjusting parameters, etc. In some examples, a system and/or application may desire to provide an on-demand graphical user interface (GUI) element, such as a visual input mechanism (e.g., a menu). Recognition of a specific, pre-determined gesture may trigger the visual display of such an element.

However, many intuitive hand gestures are difficult to discern from one another given the current accuracy of hand tracking technology. Users may trigger the display of a menu unintentionally when using hand gestures to assist their conversation, presentation, or other actions that may confuse the system. These false activations may force users to exit the current application, stopping them from their current work (e.g., interrupting an important public presentation). It is possible to use a mini menu for further confirmation before exiting the currently-used application and thereby avoid unintentional switching. However, this may be annoying to the user or otherwise undesirable.

By reserving specific gestures for system functions, user intent may be easier to discern. One gesture for calling a menu or other GUI element is the "bloom" gesture. As shown at 200 in FIG. 2, the gesture begins with the five fingertips of the hand 205 held close together and pointing upwards. The user then spreads the fingers apart, opening hand 205 with the palm facing upwards, as shown at 210. The bloom gesture may be recognized as a continuous, single gesture with motion features. The gesture may be recognized when performed with either hand of the user. The gesture may be assigned multiple functions vis a vis calling a GUI element. For example, performing a first bloom gesture may result in displaying a menu on the head-mounted display. Performing a second bloom gesture may dismiss the menu. Performing the bloom gesture from the core shell of the head-mounted display operating system may result in the display of a system menu, while performing the bloom gesture while inside an application may result in the display of an application-specific menu.

However, to efficiently recognize the bloom gesture, parameters may be relaxed in order to gain a bigger range of deployment. This may result in a high false positive rate. As a result, if the user is talking with their hands in motion, the bloom gesture may often be mimicked, and the user may unintentionally deploy the GUI element.

Figure 2B:
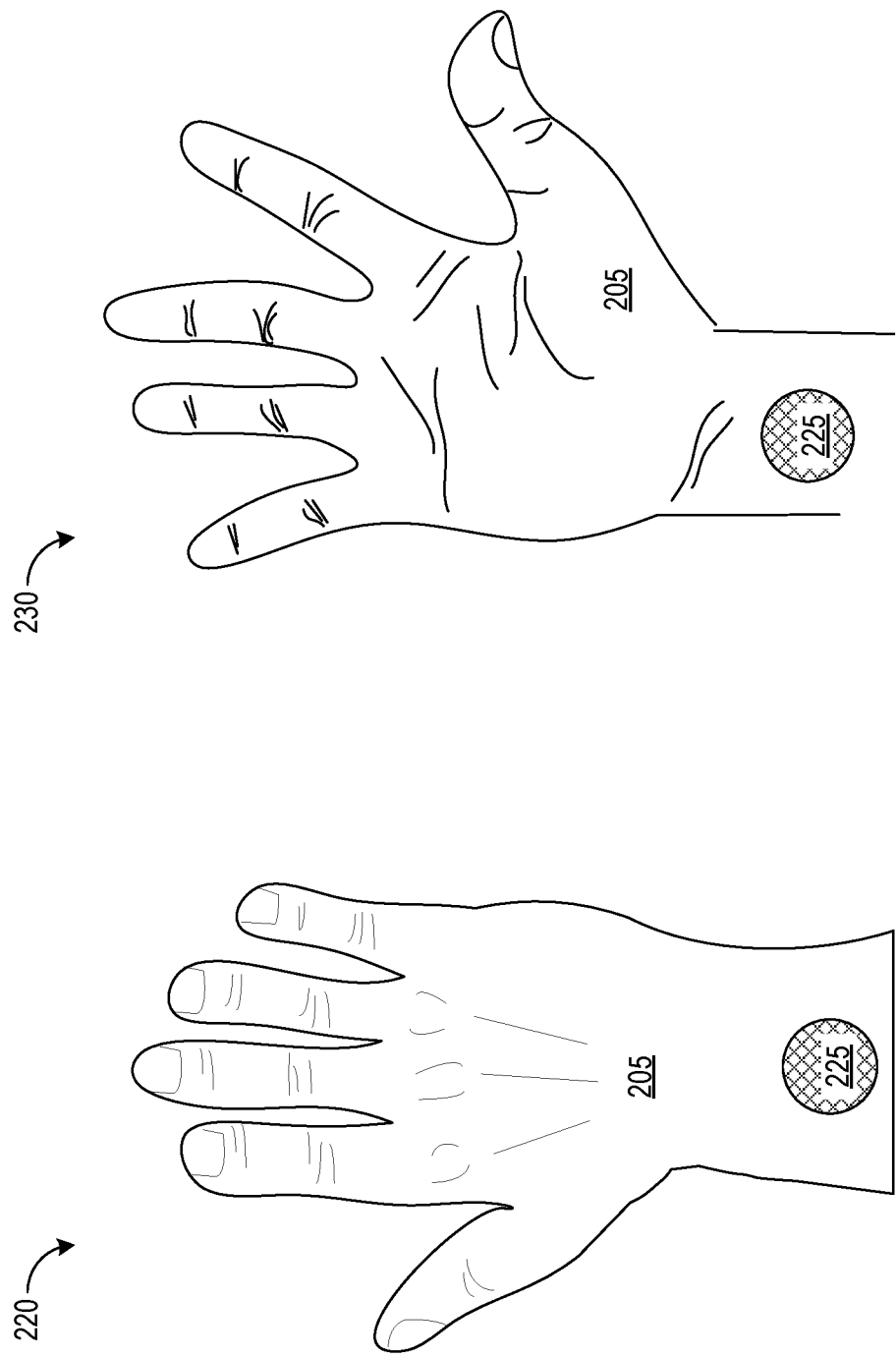
FIG. 2B shows an illustration of various affordances for evoking a graphical user interface element.

A visual affordance of a menu button may be presented on the display that may be targeted and selected by the user. FIG. 2B shows illustrations of various affordances for evoking a GUI element.

For example, as shown at 220, a button 225 may be hosted on the back of the user's hand 205, for example at the wrist of the user. Additionally or alternatively, as shown at 230, button 225 may be hosted on the front of user's hand 205. However, placing such a button at the wrist, be it on the front or back, necessitates a two-hand gesture, which may reduce the user's ability to perform other tasks, including interacting with real or virtual objects, while calling a GUI element.

Herein, examples are provided including a two-stage gesture augmented with an affordance following completion of the first stage of the gesture. For example, a visual affordance attached to or positioned near the hand performing the gesture may be displayed. Such a visual affordance may be non-intrusive, allowing the user to quickly determine whether to continue with activating the GUI element. Further, false and unintentional activation are less likely to occur when two unrelated gestures and/or gesture stages must be combined to trigger display of a GUI element. The visual affordance may lower the learning curve for the user performing the gesture, and may be rendered more subtly (or not at all) as the user learns to perform the two-stage gesture precisely.

Figure 3:
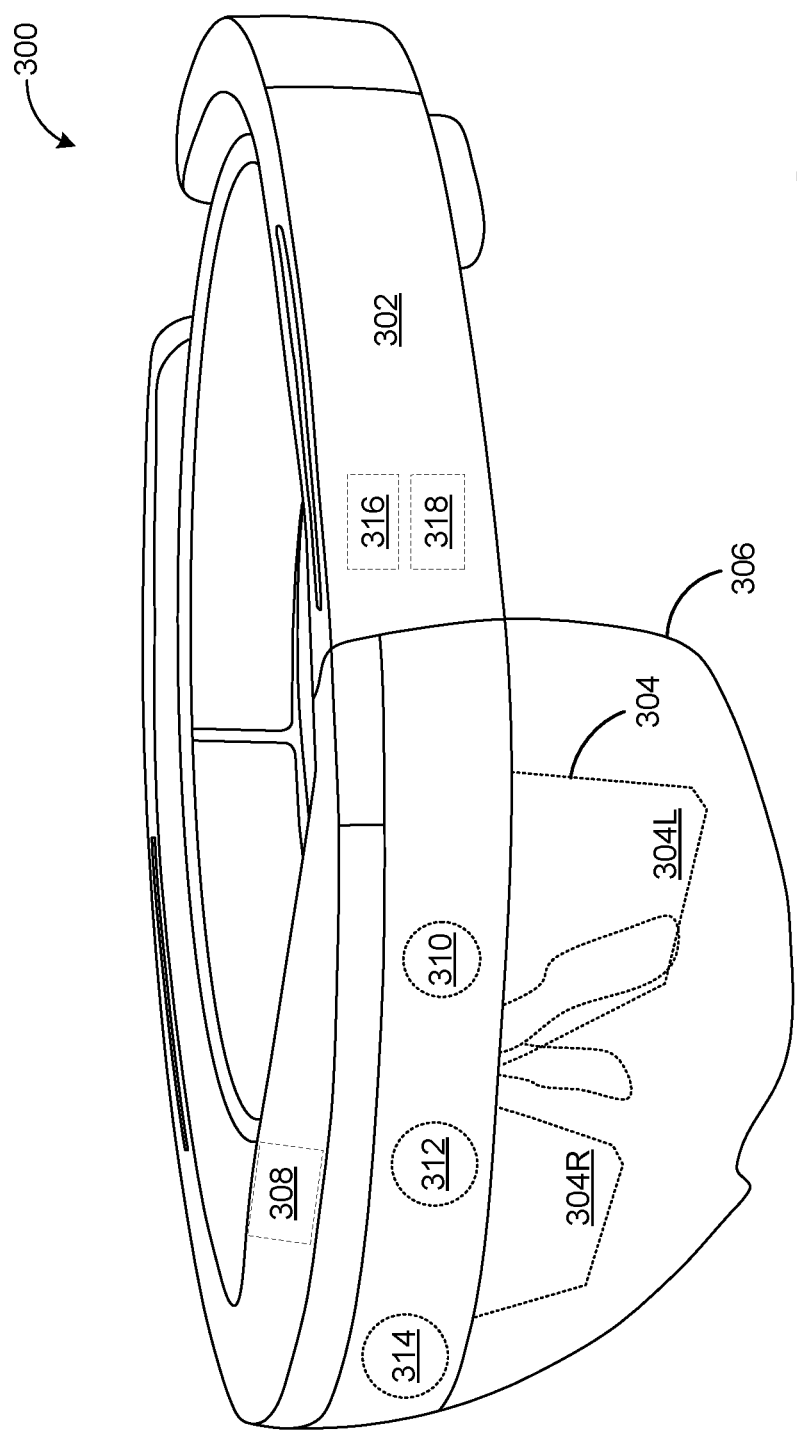
FIG. 3 shows a schematic view of a head-mounted display device according to an example of the present disclosure.

FIG. 3 schematically illustrates an example head-mounted display device 300. The head-mounted display device 300 includes a frame 302 in the form of a band wearable around a head of the user that supports see-through display componentry positioned near the user's eyes. Head-mounted display device 300 may use augmented reality technologies to enable simultaneous viewing of virtual display imagery and a real-world background. As such, the head-mounted display device 300 may generate virtual images via see-through display 304, which includes separate right and left eye displays 304R and 304L, and which may be wholly or partially transparent. The see-through display 304 may take any suitable form, such as a waveguide or prism configured to receive a generated image and direct the image towards a wearer's eye. The see-through display 304 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 304 may utilize quantum-dot display technologies, active-matrix organic LED (OLED) technology, and/or any other suitable display technologies. It will be understood that while shown in FIG. 3 as a flat display surface with left and right eye displays, the see-through display 304 may be a single display, may be curved, or may take any other suitable form.

The head-mounted display device 10 further includes an additional see-through optical component 306, shown in FIG. 3 in the form of a see-through veil positioned between the see-through display 304 and the real-world environment as viewed by a wearer. A controller 308 is operatively coupled to the see-through optical component 306 and to other display componentry. The controller 308 includes one or more logic devices and one or more computer memory devices storing instructions executable by the logic device(s) to enact functionalities of the head-mounted display device 300. The head-mounted display device 300 may further include various other components, for example an outward facing two-dimensional image camera 310 (e.g. a visible light camera and/or infrared camera), an outward facing depth imaging device 312, and an inward-facing gaze-tracking camera 314 (e.g. a visible light camera and/or infrared camera), as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Depth imaging device 312 may include an infrared light-based depth camera (also referred to as an infrared light camera) configured to acquire video of a scene including one or more human subjects. The video may include a time-resolved sequence of images of spatial resolution and frame rate suitable for the purposes set forth herein. The depth imaging device and/or a cooperating computing system (e.g., controller 308) may be configured to process the acquired video to identify one or more objects within the operating environment, one or more postures and/or gestures of the user wearing head-mounted display device 300, one or more postures and/or gestures of other users within the operating environment, etc.

The nature and number of cameras may differ in various depth imaging devices consistent with the scope of this disclosure. In general, one or more cameras may be configured to provide video from which a time-resolved sequence of three-dimensional depth maps is obtained via downstream processing. As used herein, the term "depth map" refers to an array of pixels registered to corresponding regions of an imaged scene, with a depth value of each pixel indicating the distance between the camera and the surface imaged by that pixel.

In some implementations, depth imaging device 312 may include right and left stereoscopic cameras. Time-resolved images from both cameras may be registered to each other and combined to yield depth-resolved video.

In some implementations, a "structured light" depth camera may be configured to project a structured infrared illumination having numerous, discrete features (e.g., lines or dots). A camera may be configured to image the structured illumination reflected from the scene. Based on the spacings between adjacent features in the various regions of the imaged scene, a depth map of the scene may be constructed.

In some implementations, a "time-of-flight" (TOF) depth camera may include a light source configured to project a modulated infrared illumination onto a scene. The camera may include an electronic shutter synchronized to the modulated illumination, thereby allowing a pixel-resolved phase-delay between illumination times and capture times to be observed. A time-of-flight of the modulated illumination may be calculated.

The above cameras are provided as examples, and any sensor capable of detecting hand gestures may be used.

Head-mounted display 300 further includes a gesture-recognition machine 316, and an eye-tracking machine 318. Gesture-recognition machine 316 is configured to process at least the depth video (i.e., a time-resolved sequence of depth maps and/or raw sensor data) from depth imaging device 312 and/or image data from outward facing two-dimensional image camera 310, to identify one or more human subjects in the depth video, to compute various geometric (e.g., skeletal) features of the subjects identified, and to gather from the geometric features various postural or gestural information to be used as NUI.

In one non-limiting embodiment, gesture-recognition machine 316 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Further indices may be used to label pixels corresponding to different body parts. For example, pixels imaging a left hand may be labeled with a different index than pixels imaging a right hand; or pixels imaging a pointer finger may be labeled with a different index that pixels imaging a thumb.

Gesture-recognition machine 316 also may label pixels in any suitable manner. As one example, an artificial neural network may be trained to classify each pixel with appropriate indices/labels. In this way, different features of a hand or other body part may be computationally identified.

Gesture recognition machine 316 may track different body parts from frame to frame, thereby allowing different gestures to be discerned. For example, the three-dimensional position of fingers may be tracked from frame to frame, thus allowing parameters such as finger position, finger angle, finger velocity, finger acceleration, finger-to-finger proximity, etc. to be discerned.

The position of the user's eye(s) may be determined by eye-tracking machine 318 and/or gesture recognition machine 316. Eye-tracking machine 318 may receive image data from inward-facing gaze-tracking camera 314. In some examples, inward-facing gaze-tracking camera 314 includes two or more cameras, including at least one camera trained on the right eye of the user and at least one camera trained on the left eye of the user. As an example, eye-tracking machine 318 may determine the position of the user's eye based on the center point of the user's eye, the center point of the user's pupil, and/or gesture recognition machine 316 may estimate the location of the eye based on the location of the head-joint of the virtual skeleton.

Figure 4:
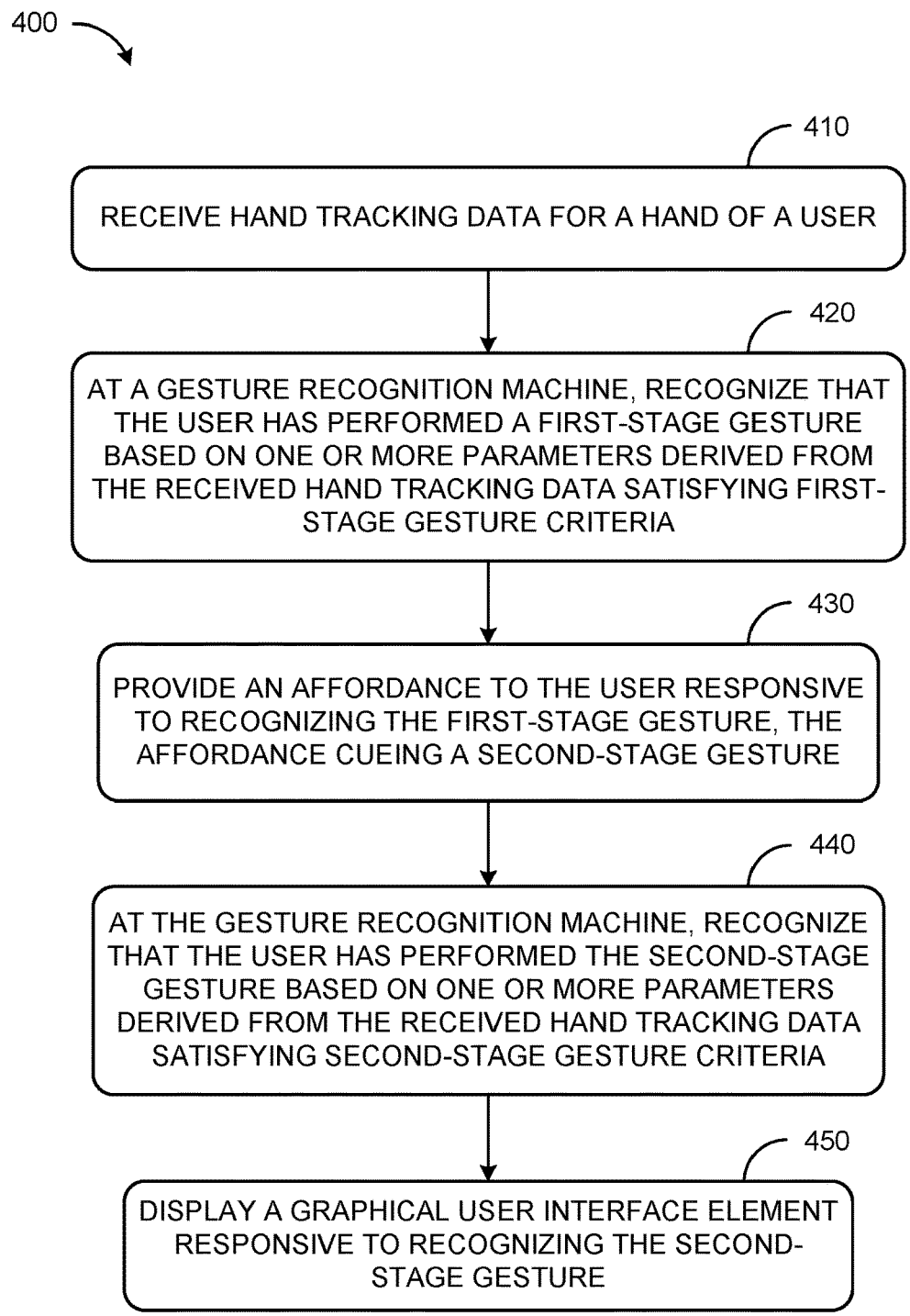
FIG. 4 shows an example method for augmenting a two-stage hand gesture input.

FIG. 4 shows a method 400 for augmenting a two-stage hand gesture input. Method 400 may be executed by a computing device, such as a head-mounted display device (e.g., head-mounted display devices 105 and 300 and/or computing system 900 described herein with regard to FIG. 9). Method 400 will primarily be described with regard to augmented reality applications, but may also be applied to virtual reality applications, mixed reality applications, non-immersive applications, and any other systems, environments, and applications having a natural user interface configured to track hand motion and/or otherwise receive gesture input.

At 410, method 400 includes receiving hand tracking data for a hand of a user. Hand tracking data may be derived from received depth information, received RGB image data, received flat IR image data, etc. Data may be received in the form of a plurality of different, sequential frames. The received hand tracking data may include a feature position for each of a plurality of different hand features at each of a plurality of different frames. The received hand tracking data may include data for one or both hands of a user.

In some embodiments, a gesture recognition machine, such as gesture recognition machine 316, may be configured to analyze the pixels of a depth map that correspond to the user, in order to determine what part of the user's body each pixel corresponds to. A variety of different body-part assignment techniques can be used to this end. In one example, each pixel of the depth map with an appropriate person index (see above) may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses. These poses may include the ready-bloom gesture, the bloom gesture, the bloom-in gesture, etc. Trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 5B:
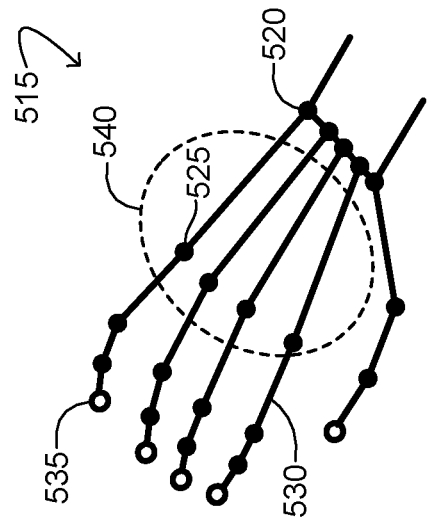
FIG. 5B shows aspects of a hand portion of an example virtual skeleton.
Figure 5A:
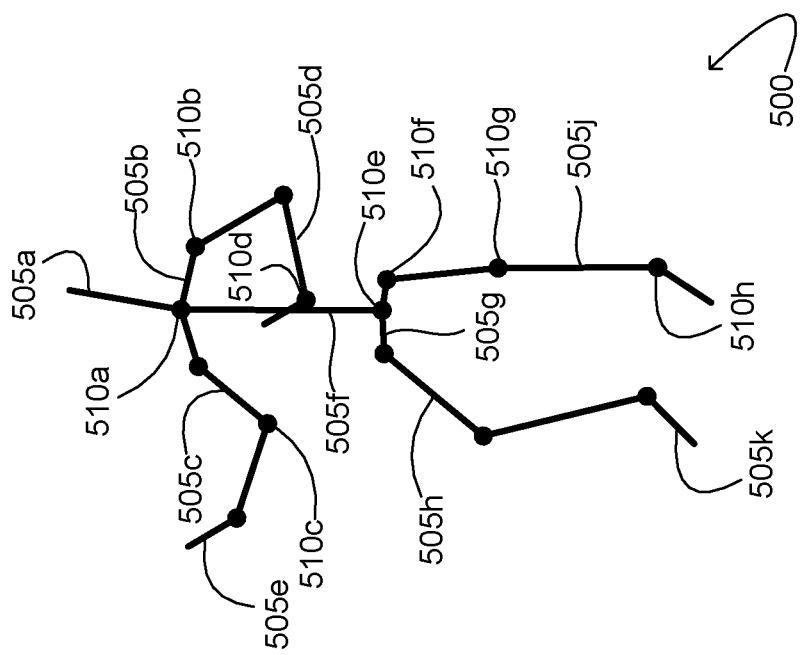
FIG. 5A shows aspects of an example virtual skeleton.

In some implementations, a virtual skeleton or other data structure for tracking feature positions (e.g., joints) may be fit to the pixels of depth and/or color video that correspond to the user. FIG. 5A shows an example virtual skeleton 500. The virtual skeleton includes a plurality of skeletal segments 505 pivotally coupled at a plurality of joints 510. In some embodiments, a body-part designation may be assigned to each skeletal segment and/or each joint. In FIG. 5A, the body-part designation of each skeletal segment 505 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 510 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 5A is in no way limiting. A virtual skeleton consistent with this disclosure may include virtually any type and number of skeletal segments, joints, and/or other features.

In a more particular embodiment, point clouds (portions of a depth map) corresponding to the user's hands may be further processed to reveal the skeletal substructure of the hands. FIG. 5B shows an example hand portion 515 of a user's virtual skeleton 500. The hand portion includes wrist joints 520, finger joints 525, adjoining finger segments 530, and adjoining finger tips 535. Joints and segments may be grouped together to form a portion of the user's hand, such as palm portion 540.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined.

The foregoing description should not be construed to limit the range of approaches usable to construct a virtual skeleton 500 or otherwise identify various hand features, for hand features may be derived from a depth map and/or other sensor data in any suitable manner without departing from the scope of this disclosure.

Regardless of the method used to extract features, once identified, each feature may be tracked across frames of the depth and/or image data. The plurality of different hand features may include a plurality of finger features, a plurality of fingertip features, a plurality of knuckle features, a plurality of wrist features, a plurality of palm features, a plurality of dorsum features, etc.

In some examples, receiving hand tracking data for the first hand of the user includes receiving depth data for an environment, fitting a virtual skeleton to point clouds of the received depth data, assigning hand joints to the virtual skeleton, and tracking positions of the assigned hand joints across sequential depth images.

At 420, method 400 includes, at a gesture recognition machine, recognizing that the user has performed a first-stage gesture based on one or more parameters derived from the received hand tracking data satisfying first-stage gesture criteria. For each hand feature, the position, speed, rotational velocity, etc. may be calculated to determine a set of parameters, or pseudo-gesture, and the determined parameters may then be evaluated based on criteria specific to the first-stage gesture.

The first-stage gesture input may include a single step (e.g., placing the hand in a specific conformation) or multiple steps (e.g., transitioning between a first and second conformation). The gesture input may require the user to hold their hand in a position or conformation for a threshold period of time, in order to mitigate accidental recognition and triggering.

Figure 6:
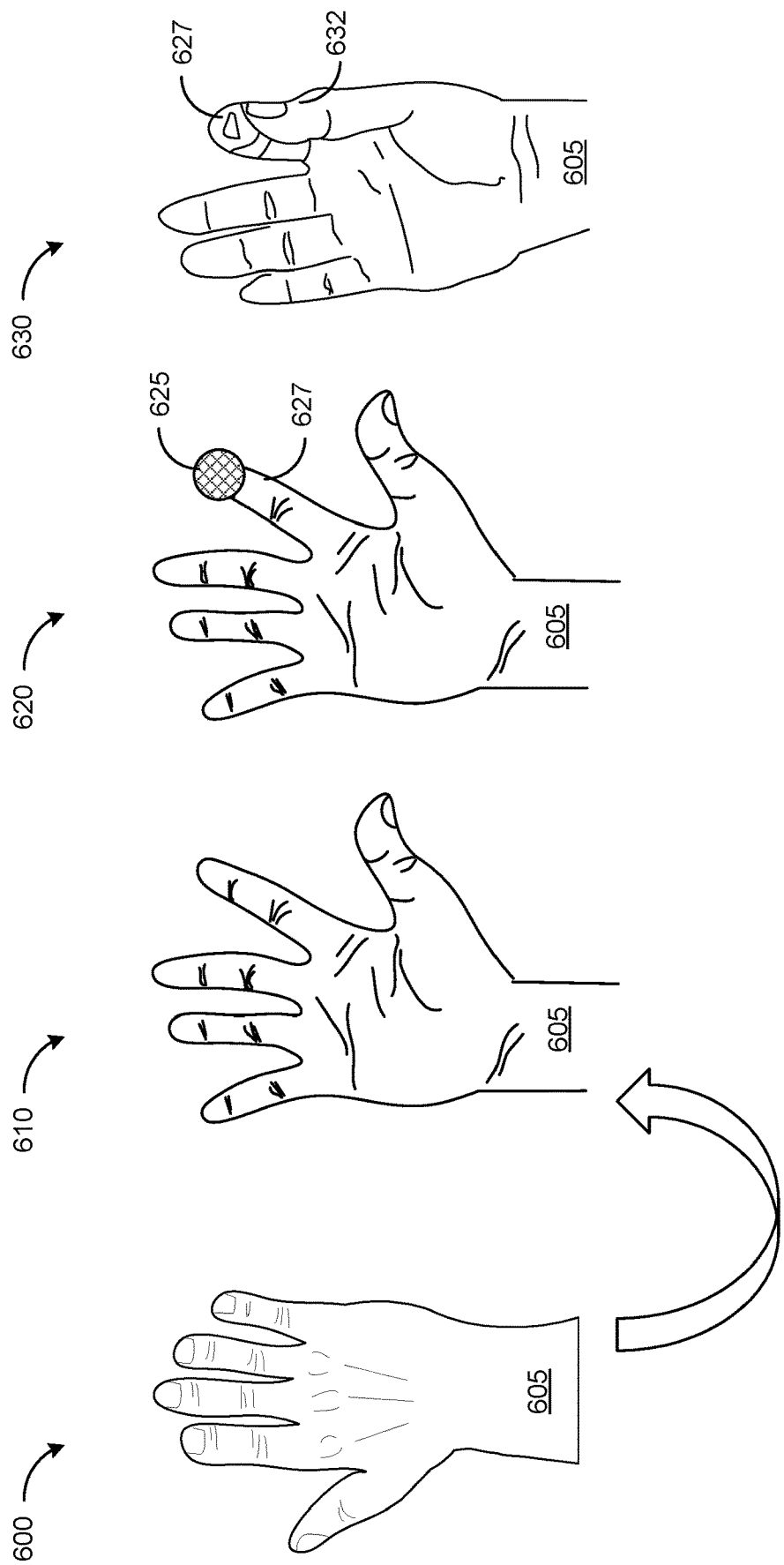
FIG. 6 shows an illustration of one example of the method of FIG. 4.

As an example, FIG. 6 shows a user performing a palm-flip gesture. At 600, the user is shown holding hand 605 with a palm facing downward. At 610, the user has flipped the orientation of hand 605 by performing a palm-flip gesture, and is shown holding hand 605 with a palm facing up (e.g., like catching a rain drop in the air).

The palm-flip gesture may be identified via a number of specific gesture criteria. For example, the first-stage gesture criteria may include a plurality of palm features transitioning from facing downwards within a threshold of absolute vertical to facing upwards within a threshold of absolute vertical. If the palm features are not visible to the imaging devices, they may be inferred or substituted, for example based on dorsum features and/or finger features.

In some examples, the first-stage gesture criteria include the plurality of palm features facing upwards within a threshold of absolute vertical for a threshold duration. In other words, following the palm-flip gesture, the user may be required to hold their hand in the palm-up state for a duration to complete the first-stage gesture.

The palm-flip gesture is not a simple command; different users may interpret it differently. Constraints and criteria may be relaxed or modelled to allow for differences. For example, depending on their orientation and personal ergonomics, the user may not face their palm so that it is perfectly parallel to the ground beneath them. As such, the palm-up state may be defined based on a parameter including an angle between a direction from the user's eyes to their palm, and the palm's surface normal direction. An angle within a threshold may be considered to be facing up.

As another example, the first-stage gesture criteria may include a position of the plurality of different hand features within a field of view of the user. This may additionally or alternatively include a gaze direction of the user. For example, the first-stage gesture criteria may include a gaze direction of the user being within a threshold distance of the plurality of hand features. In other words, if the user is looking at the hand while performing a gesture, it may be more likely that the user is deliberately performing a specific gesture. Thresholds and criteria for recognizing the first-stage gesture may be adjusted accordingly.

In some examples, the first-stage gesture criteria may be evaluated by simple thresholding of each parameter. In other examples, fuzzy logic may be employed where certain parameters are weighted more than others. In other examples, an artificial neural network may be trained to assess gesture confidence based on one or more frames of feature data input.

For example, if the gaze direction of the user is within a threshold distance of the plurality of hand features for a predetermined duration, the thresholds and criteria for determining the palm-flip gesture may be adjusted and/or relaxed. The orientation of the hand in the palm-up orientation for a duration may be weighted more than the orientation and movement of the hand prior to attaining the palm-up orientation. The user may thus place the hand in the palm-up orientation and gaze at the hand for a duration to satisfy the first-stage gesture criteria.

Returning to FIG. 4, at 430, method 400 includes providing an affordance to the user responsive to recognizing the first-stage gesture, the affordance cueing a second-stage gesture. The affordance may be provided in the form of an audio cue, a haptic cue, a visual cue, etc. For example, When the gesture-recognition machine detects the palm-up state such as at 610 of FIG. 6, a visual affordance may be presented on the display. For example as shown at 620, visual affordance 625 may take the form of a finger button or ball that is displayed at the tip of the user's index finger 627. The visual affordance may provide the user with an intuitive indication of the next stage in triggering the display of a GUI element and may further indicate the result of performing the next portion of the sequence. For example, as shown at 630, the visual affordance 625 may encourage users to pinch their index finger 627 and thumb 632 together and trigger the system gesture event intuitively. The visual affordance may be displayed for a predetermined time period, and/or until the user provides an additional gesture command canceling the trigger sequence.

Returning to FIG. 4, at 440, method 400 includes, at the gesture recognition machine, recognizing that the user has performed the second-stage gesture based on one or more parameters derived from the received hand tracking data satisfying second-stage gesture criteria.

The second-stage gesture input may be predetermined and may be based on the visual affordance. The second-stage gesture may be performed by the same hand that performed the first-stage gesture. For example, if the affordance is presented as a button or ball at the user's fingertips, the second-stage gesture input may include the user pinching the affordance between their finger and thumb, as indicated at 630 of FIG. 6.

The second-stage gesture criteria may only be satisfiable from the performed first-stage criteria. In other words, if the gesture-recognition machine recognizes that the first-stage gesture is performed, the performance of the second-stage gesture can be evaluated. If not, then the second-stage gesture will not be determined to be performed. The same gesture recognition machine may be used as for the first-stage gesture. However, if the first-stage gesture is not determined to be performed, the gesture recognition machine may not even evaluate hand movement parameters against the second-stage gesture criteria. In examples wherein a visual affordance is provided, the gesture recognition machine may assess one or more parameters derived from the received hand tracking data and corresponding to hand gestures made while the visual affordance is displayed. For example, the visual affordance may include a graphical interface element, and performing the second-stage gesture may include manually interacting with the graphical interface element. In some examples, the second-stage criteria may include the user interacting with the visual affordance with the off-hand of the user. In particular, such criteria may be included when the visual affordance is positioned at the wrist of the user's hand, as depicted in FIG. 2B.

In examples wherein the second-stage gesture includes pinching the index finger and thumb together around a visual affordance, the plurality of different hand features may include a plurality of fingertip features correlating to an index finger of the hand of the user and a plurality of fingertip features correlating to a thumb of the hand of the user. The second-stage gesture criteria may thus include fingertip features correlating to the index finger and fingertip features correlating to the thumb closing to within a threshold distance of the visual affordance. In some examples, each of the index finger and thumb must be within the threshold distance of the visual affordance. In examples where the visual affordance is affixed to the index finger, the index finger distance to the visual affordance is known, and may thus be ignored. In some examples, the distance between the fingertips of the index finger and thumb may be a criterion.

Additionally or alternatively, the second-stage gesture criteria may include a gaze direction of the user and/or a head orientation of the user. For example, the user may look at the visual affordance for a threshold duration to invoke the second-stage gesture. In some examples wherein the gaze direction of the user and/or the head orientation of the user was used to fulfill the second-stage criteria, the second-stage gesture criteria may include maintaining the gaze direction of the user and/or the head orientation of the user. For example, the user may look at their upturned palm to complete the first gesture, then maintain their gaze direction and/or head orientation while pinching their index finger and thumb together around a visual affordance.

The first-stage gesture criteria and the second-stage gesture criteria optionally may be user-specific. In this way, the criteria may be built for a specific user, rather than a fixed set of criteria, thereby acknowledging that different users perform the gestures slightly differently. User specificity may be trained in a calibration phase where the user performs various gestures and this test data is used to train an artificial neural network, for example and/or includes assigning hand joints to a virtual skeleton may be based at least in part on image data of the user performing the first-stage gesture and the second-stage gesture.

Further, physical differences between the hands of different users can be accounted for. For example, a user missing a finger or having a syndactyly would necessitate different criteria than for a user with five independent fingers, and may necessitate alternative placement of the visual affordance. User-specific criteria and parameters may be stored in preferences for the user. When the user signs in, the preferences may be retrieved.

Figure 7:
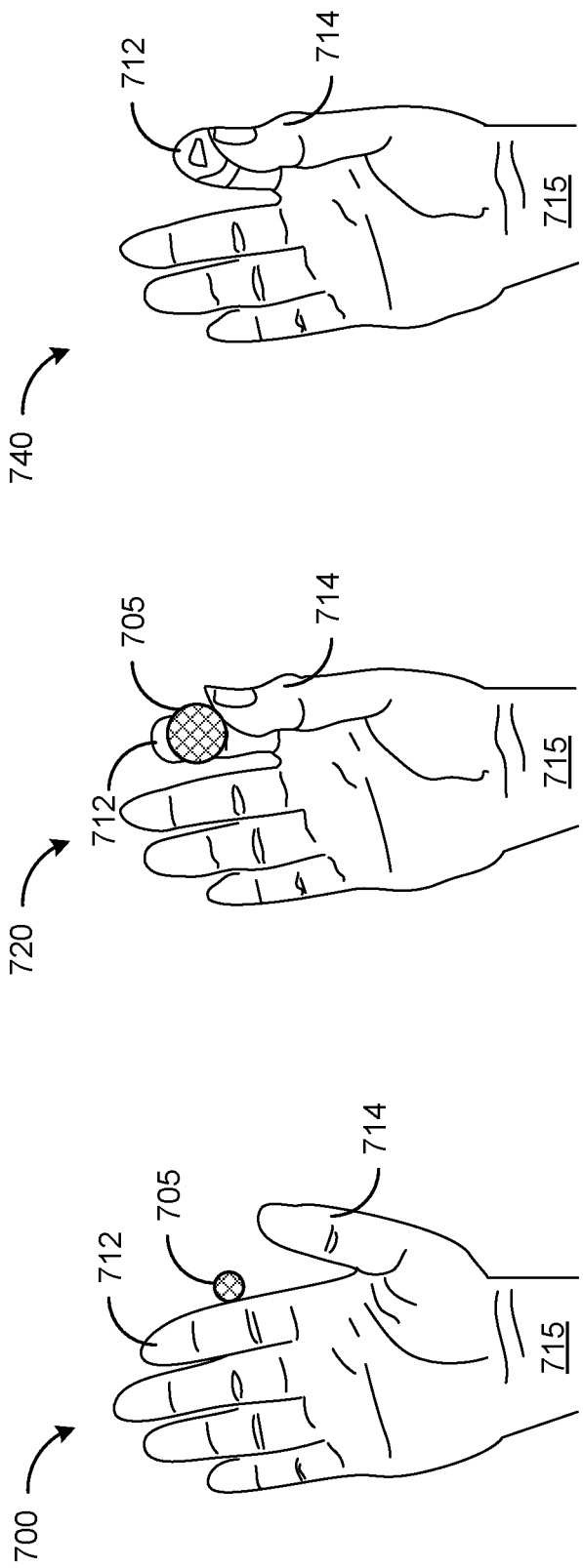
FIG. 7 shows an illustration of an example affordance for evoking a graphical user interface element.

FIG. 7 shows a series of illustrations of an additional example affordance for evoking a GUI element. For example, the visual affordance may be a graphical interface element rendered so as to appear between two digits of the hand of the use in a grasping path of those two digits. In this example, rather than place a button at the user's fingertip, at 700, a ball 705 is displayed that floats between the index finger 712 and thumb 714 of the hand 715 of the user. In examples where hand and finger tracking lags, a visual affordance affixed to a finger may not stay in the correct place, thus causing a visual lag. A floating ball does not necessarily present with such a visual delay. As index finger 712 and thumb 714 move together, the floating ball 705 may intensify in color, shape, size, etc. and become more obvious, as shown at 720, then may disappear when index finger 712 and thumb 714 meet, as shown at 740. Numerous variations may be provided on this example framework to tailor the trigger sequence for specific applications.

Returning to FIG. 4, at 450, method 400 includes displaying a GUI element responsive to recognizing the second-stage gesture. As an example, the GUI element may include a visual input mechanism such as a menu, e.g., a system menu, application specific menu, or any other menu, and/or may include other holographic user interface with which the user may interact such as a visual keyboard, number pad, dial, switch, virtual mouse, joystick, or any other visual input mechanism that allows the user to input commands. In some examples, GUI element may not be an input mechanism, rather, the GUI element may be a display item that may be interacted with by the user, and/or may be a display item that cannot be interacted with, for example a clock displayed at a fixed position on the display. The GUI element may be positioned based on the position of the hand of the user. For example, at 800 of FIG. 8, a visual input mechanism 805 is shown adjacent to a hand 810 of a user performing a pinch (e.g., second-stage) gesture. In this way, the user controls the placement of the GUI element before deploying the GUI element and can maintain the GUI element within the user's FOV. Once deployed, the user may reposition or rescale the GUI element using one or more specified gestures.

Figure 8:
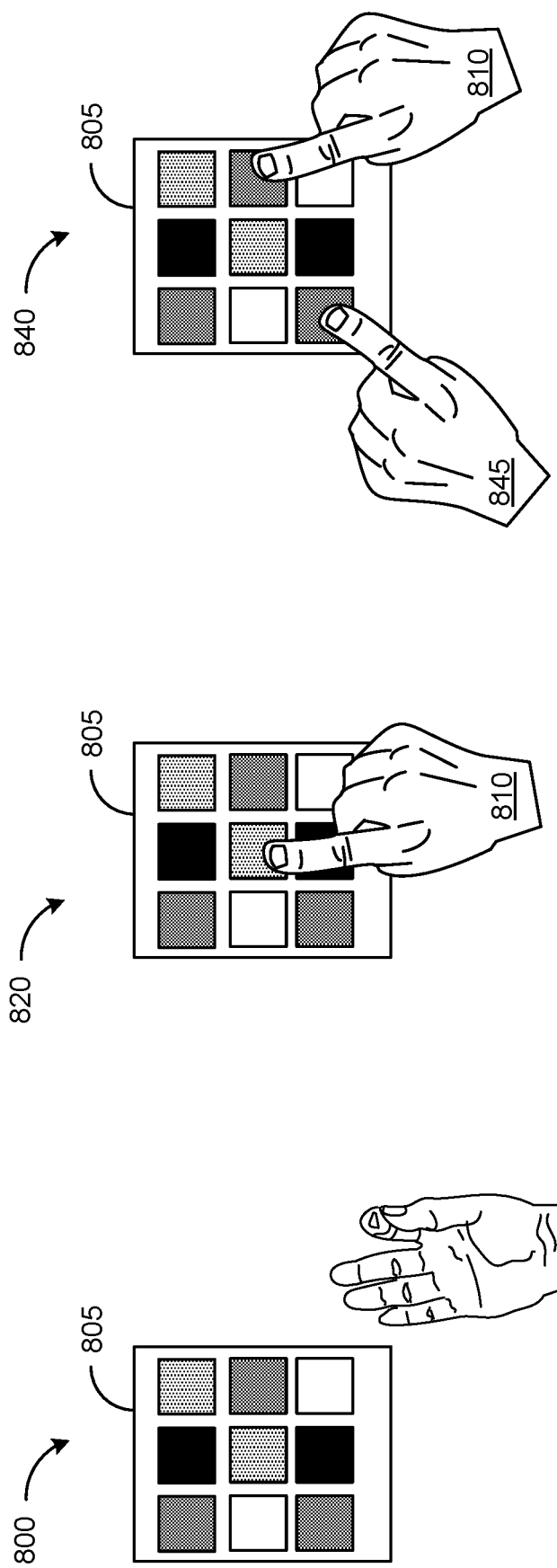
FIG. 8 shows illustrations of a user interacting with a visual input mechanism.

While the two-stage gesture sequence may be performed with one hand, the visual affordance may be manipulated with either the gesture hand or the off-hand of the user. At 820, FIG. 8 depicts hand 810 manipulating visual input mechanism 805. At 840, FIG. 8 depicts a user manipulating visual input mechanism 805 with both gesture (right) hand 810 and off (left) hand 845.

In some examples, the same two-stage gesture sequence can be used to close the GUI element. In some examples, the if the GUI element is closed, it may be reopened using a simplified gesture (e.g., a pinch) within a threshold duration.

In some examples, the gesture recognition machine will recognize gestures whenever the user's hand is within the FOV of the imaging devices used for input. This may allow for blind users to provide input to the NUI system. Rather than visual affordances, the user may be cued through the use of haptic and/or audio feedback. Further, rather than evoking a visual menu or other GUI element, the system may enter a state where the user is enabled to issue specific voice or gesture commands, or where specific voice or gesture commands are assigned to particular responses, such as when a particular gesture is used for a different purpose within an application.

App specific affordances may be provided, allowing a user to pull up either a system menu or app menu, for example. In some examples, a user operating within an application may pull an app specific menu by performing the two-stage gesture, and may pull up a system menu by performing the two-stage gesture from within the core operating system. In some examples, different visual affordances may be presented on different fingers, allowing the user to call different GUI elements by pinching different fingers together.

In some examples, the pinching of the visual affordance may actually trigger upon release, akin to a mouse click. In this way, the sequence may be canceled by moving hand position, orientation, etc. mid-sequence. In some examples, the user may trigger a different command by pinching and holding for a predetermined duration.

The visual affordance may be adaptive. For example, a novice user may need to view the affordance. An advanced user may know the result of the first part of the sequence, and can thus perform gestures outside of the field of view of the outward facing cameras of the head-mounted display and/or the affordance animation appearance may be reduced as long as gesture is detectable (e.g. via a stationary camera or second user's head-mounted display).

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
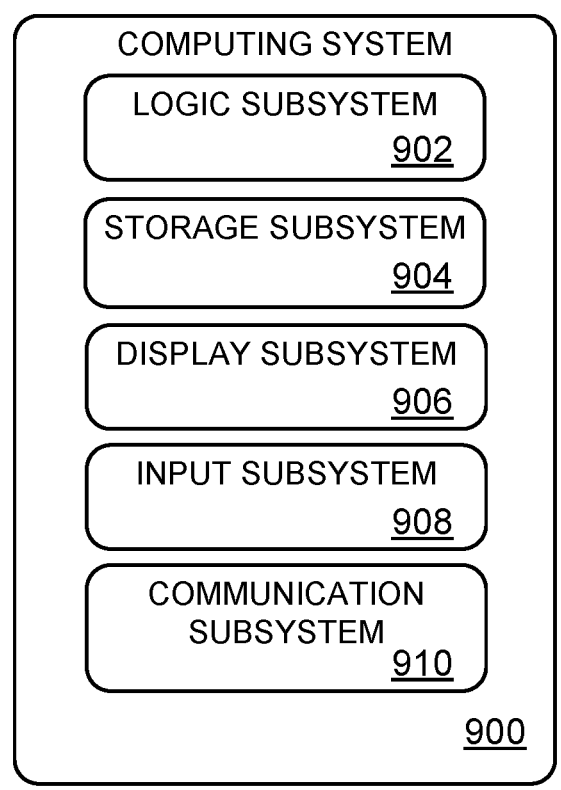
FIG. 9 shows a schematic view of an example computing device.

FIG. 9 schematically shows a simplified representation of a computing system 900 configured to provide any to all of the compute functionality described herein. Computing system 900 may take the form of one or more virtual/augmented/mixed reality computing devices, personal computers, network-accessible server computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 906 may be used to present a visual representation of data held by storage subsystem 904. This visual representation may take the form of a graphical user interface (GUI) including holographic virtual objects. Display subsystem 906 may include one or more display devices utilizing virtually any type of technology. In some implementations, display subsystem 906 may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

As an example, a method for augmenting a two-stage hand gesture input comprises: receiving hand tracking data for a hand of a user; at a gesture recognition machine, recognizing that the user has performed a first-stage gesture based on one or more parameters derived from the received hand tracking data satisfying first-stage gesture criteria; providing an affordance to the user responsive to recognizing the first-stage gesture, the affordance cueing a second-stage gesture; at the gesture recognition machine, recognizing that the user has performed the second-stage gesture based on one or more parameters derived from the received hand tracking data satisfying second-stage gesture criteria; and displaying a graphic user interface element responsive to recognizing the second-stage gesture. In such an example, or any other example, the received hand tracking data may additionally or alternatively include a feature position for each of a plurality of different hand features at each of a plurality of different frames. In any of the preceding examples, or any other example, the plurality of different hand features may additionally or alternatively include a plurality of palm features, and wherein the first-stage gesture criteria include the plurality of palm features transitioning from facing downwards within a threshold of absolute vertical to facing upwards within a threshold of absolute vertical. In any of the preceding examples, or any other example, the first-stage gesture criteria may additionally or alternatively include the plurality of palm features facing upwards within a threshold of absolute vertical for a threshold duration. In any of the preceding examples, or any other example, the first-stage gesture criteria may additionally or alternatively include a position of the plurality of different hand features within a field of view of the user. In any of the preceding examples, or any other example, the provided affordance may additionally or alternatively be a visual affordance. In any of the preceding examples, or any other example, the visual affordance may additionally or alternatively be a graphical interface element, and wherein performing the second-stage gesture includes manually interacting with the graphical interface element. In any of the preceding examples, or any other example, the visual affordance may additionally or alternatively be a graphical interface element rendered so as to appear adjacent to one or more fingers of the hand of the user. In any of the preceding examples, or any other example, the visual affordance may additionally or alternatively be a graphical interface element rendered so as to appear between two digits of the hand of the user in a grasping path of those two digits. In any of the preceding examples, or any other example, the plurality of different hand features may additionally or alternatively include a plurality of fingertip features correlating to an index finger of the hand of the user and a plurality of fingertip features correlating to a thumb of the hand of the user, and the second-stage gesture criteria may additionally or alternatively include fingertip features correlating to the index finger and fingertip features correlating to the thumb closing to within a threshold distance of the visual affordance. In any of the preceding examples, or any other example, the second-stage gesture criteria may additionally or alternatively include a gaze direction of the user and/or a head orientation of the user. In any of the preceding examples, or any other example, the provided affordance may additionally or alternatively be a haptic affordance. In any of the preceding examples, or any other example, the gesture recognition machine may additionally or alternatively include an artificial neural network previously trained to recognize the plurality of different hand features. In any of the preceding examples, or any other example, receiving hand tracking data for the hand of the user may additionally or alternatively include: receiving depth data for an environment; fitting a virtual skeleton to point clouds of the received depth data; assigning hand joints to the virtual skeleton based at least in part on image data of the user performing the first-stage gesture and the second-stage gesture; and tracking positions of the assigned hand joints across sequential depth images.

In another example, a system for a head-mounted display comprises one or more outward-facing image sensors; a display device; a gesture recognition machine configured to: receive hand tracking data for a hand of a user; recognize that the user has performed a first-stage gesture based on one or more parameters derived from the received hand tracking data satisfying first-stage gesture criteria; indicate to the display device to provide an affordance to the user responsive to recognizing the first-stage gesture, the affordance cueing a second-stage gesture; recognize that the user has performed the second-stage gesture based on one or more parameters derived from the received hand tracking data satisfying second-stage gesture criteria; and indicate to the display device to display a graphical user interface element responsive to recognizing the second-stage gesture. In such an example, or any other example, the received hand tracking data may additionally or alternatively include a feature position for each of a plurality of different hand features at each of a plurality of different frames, wherein the plurality of different hand features include a plurality of palm features, and wherein the first-stage gesture criteria include the plurality of palm features transitioning from facing downwards within a threshold of absolute vertical to facing upwards within a threshold of absolute vertical for a predetermined duration. In any of the preceding examples, or any other example, the provided affordance may additionally or alternatively be a visual affordance. In any of the preceding examples, or any other example, the visual affordance may additionally or alternatively be a graphical interface element rendered so as to appear adjacent to one or more fingers of the hand of the user. In any of the preceding examples, or any other example, the plurality of different hand features may additionally or alternatively include a plurality of fingertip features correlating to an index finger of the hand of the user and a plurality of fingertip features correlating to a thumb of the hand of the user, and wherein the second-stage gesture criteria includes fingertip features correlating to the index finger and fingertip features correlating to the thumb closing to within a threshold distance of the visual affordance.

In yet another example, a method for augmenting a two-stage hand gesture input comprises receiving hand tracking data for a hand of a user; at a gesture recognition machine, recognizing that the user has performed a palm-flip gesture based on one or more parameters derived from the received hand tracking data satisfying palm-flip gesture criteria; providing a visual affordance to the user responsive to recognizing the palm flip gesture, the visual affordance being a graphical interface element rendered so as to appear adjacent to one or more fingers of the hand of the user; at the gesture recognition machine, recognizing that the user has performed a pinch gesture so as to pinch the visual affordance between one of the fingers of the hand of the user and a thumb of the user, based on one or more parameters derived from the received hand tracking data satisfying second-stage gesture criteria; and displaying a graphical user interface element responsive to recognizing the pinch gesture.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for augmenting a two-stage hand gesture input, comprising:
receiving hand tracking data for a hand of a user;
at a gesture recognition machine, recognizing that the user has performed a first-stage gesture based on one or more parameters derived from the received hand tracking data satisfying first-stage gesture criteria;
providing a visual affordance to the user responsive to recognizing the first-stage gesture, the visual affordance being a graphical interface element rendered so as to appear to float in the space between two digits of the hand of the user without being tethered to either of the two digits, the visual affordance cueing a second-stage gesture, where the second-stage gesture includes the user grasping the visual affordance with the two digits of the hand of the user;
at the gesture recognition machine, recognizing that the user has performed the second-stage gesture based on one or more parameters derived from the received hand tracking data satisfying second-stage gesture criteria; and
responsive to recognizing the second-stage gesture, ceasing to provide the visual affordance and displaying a graphic user interface element in addition to other displayed content.

2. The method of claim 1, wherein the received hand tracking data includes a feature position for each of a plurality of different hand features at each of a plurality of different frames.

3. The method of claim 2, wherein the plurality of different hand features include a plurality of palm features, and wherein the first-stage gesture criteria include the plurality of palm features transitioning from facing downwards within a threshold of absolute vertical to facing upwards within a threshold of absolute vertical.

4. The method of claim 3, wherein the first-stage gesture criteria include the plurality of palm features facing upwards within a threshold of absolute vertical for a threshold duration.

5. The method of claim 2, wherein the first-stage gesture criteria include a position of the plurality of different hand features within a field of view of the user.

6. The method of claim 2, wherein the plurality of different hand features include a plurality of fingertip features correlating to an index finger of the hand of the user and a plurality of fingertip features correlating to a thumb of the hand of the user, and wherein the second-stage gesture criteria includes fingertip features correlating to the index finger and fingertip features correlating to the thumb closing to within a threshold distance of the visual affordance.

7. The method of claim 1, wherein the second-stage gesture criteria include a gaze direction of the user and/or a head orientation of the user.

8. The method of claim 1, wherein the first-stage gesture criteria include a gaze direction of the user and/or a head orientation of the user.

9. The method of claim 1, wherein the gesture recognition machine includes an artificial neural network previously trained to recognize the plurality of different hand features.

10. The method of claim 1, wherein receiving hand tracking data for the hand of the user includes:
receiving depth data for an environment;
fitting a virtual skeleton to point clouds of the received depth data;
assigning hand joints to the virtual skeleton based at least in part on image data of the user performing the first-stage gesture and the second-stage gesture; and
tracking positions of the assigned hand joints across sequential depth images.

11. The method of claim 1, wherein a visual appearance of the graphical interface element intensifies from a time point when the user initiates the second-stage gesture until the second-stage gesture is recognized.

12. A method for augmenting a two-stage hand gesture input, comprising:
receiving hand tracking data for a hand of a user;
at a gesture recognition machine, recognizing that the user has performed a palm-flip gesture based on one or more parameters derived from the received hand tracking data satisfying palm-flip gesture criteria;

providing a visual affordance to the user responsive to recognizing the palm flip gesture, the visual affordance being a graphical interface element rendered so as to appear adjacent to one or more fingers of the hand of the user, but not rendered so as to be tethered to the one or more fingers of the hand of the user;

at the gesture recognition machine, recognizing that the user has performed a pinch gesture so as to pinch the visual affordance between one of the fingers of the hand of the user and a thumb of the user, based on one or more parameters derived from the received hand tracking data satisfying second-stage gesture criteria; and responsive to recognizing the pinch gesture, ceasing to provide the visual affordance and displaying a graphic user interface element in addition to other displayed content.

13. The method of claim 12, wherein the graphic user interface element is displayed in response to recognizing a release of the pinch gesture.

14. The method of claim 13, where different commands are triggered based on a recognized duration the user holds the pinch gesture prior to releasing the pinch gesture.

15. The method of claim 12, further comprising:

responsive to recognizing a second pinch gesture while the graphic user interface element is being displayed, closing the graphic user interface element; and responsive to recognizing a third pinch gesture within a threshold duration of closing the graphic user interface element, reopening the graphic user interface element.

* * * * *